United States Patent
Heath et al.

(10) Patent No.: US 9,291,409 B1
(45) Date of Patent: Mar. 22, 2016

(54) COMPRESSOR INTER-STAGE TEMPERATURE CONTROL

(71) Applicants: Rodney T. Heath, Framington, NM (US); Forrest D. Heath, Katy, TX (US); Gary Heath, Farmington, NM (US)

(72) Inventors: Rodney T. Heath, Framington, NM (US); Forrest D. Heath, Katy, TX (US); Gary Heath, Farmington, NM (US)

(*) Notice: Subject to any disclaimer, the term of this patent is extended or adjusted under 35 U.S.C. 154(b) by 182 days.

(21) Appl. No.: 14/213,152

(22) Filed: Mar. 14, 2014

Related U.S. Application Data

(60) Provisional application No. 61/798,380, filed on Mar. 15, 2013.

(51) Int. Cl.
| | |
|---|---|
| *B01D 53/14* | (2006.01) |
| *B01F 3/04* | (2006.01) |
| *F28F 27/00* | (2006.01) |
| *B01D 53/78* | (2006.01) |

(52) U.S. Cl.
CPC ............. *F28F 27/00* (2013.01); *B01D 53/14* (2013.01); *B01D 53/78* (2013.01); *B01F 3/04021* (2013.01); *B01F 3/04468* (2013.01)

(58) Field of Classification Search
CPC ........ B01D 53/00; B01D 53/14; B01D 53/74; B01D 53/78; B01F 3/04; B01F 3/04007; B01F 3/04021; B01F 3/04468
USPC .................. 95/39, 42; 261/115, 117, 152
See application file for complete search history.

(56) References Cited

U.S. PATENT DOCUMENTS

| | | |
|---|---|---|
| 844,694 A | 2/1907 | Smith |
| 1,903,481 A | 4/1933 | Schweisthal |
| 2,225,959 A | 12/1940 | Miller |
| 2,726,729 A | 12/1955 | Williams |
| 2,738,026 A | 3/1956 | Glasgow et al. |
| 2,765,872 A | 10/1956 | Hartman et al. |
| 2,786,543 A | 3/1957 | Hayes et al. |
| 2,812,827 A | 11/1957 | Worley et al. |
| 2,815,901 A | 12/1957 | Hale |
| 2,853,149 A | 9/1958 | Gosselin |
| 2,937,140 A | 5/1960 | Stinson |
| 2,970,107 A | 1/1961 | Gilmore |
| 2,984,360 A | 5/1961 | Smith |
| 3,018,640 A | 1/1962 | Heller et al. |
| 3,025,928 A | 3/1962 | Heath |

(Continued)

FOREIGN PATENT DOCUMENTS

| | | |
|---|---|---|
| AR | 011862 | 9/2000 |
| AR | 024366 | 10/2002 |

(Continued)

OTHER PUBLICATIONS

"Natural Gas Dehydration", The Environmental Technology Verification Program, Sep. 2003.

(Continued)

*Primary Examiner* — Robert A Hopkins
(74) *Attorney, Agent, or Firm* — Peacock Myers, P.C.; Deborah A. Peacock; Justin R. Jackson

(57) ABSTRACT

A method, system, and apparatus for controlling the gas temperature of gas flowing between compression stages so that the temperature of the gas always remains above the dewpoint and hydrate temperature of the gas. The invention also allows for controlling inner stage compression temperatures that can be part of a new compressor assembly or retrofitted to compressors already installed and operating.

18 Claims, 1 Drawing Sheet

(56) References Cited

U.S. PATENT DOCUMENTS

| | | |
|---|---|---|
| 3,027,651 A | 4/1962 | Nerge |
| 3,094,574 A | 6/1963 | Glasgow et al. |
| 3,105,855 A | 10/1963 | Meyers |
| 3,152,753 A | 10/1964 | Adams |
| 3,182,434 A | 5/1965 | Fryar |
| 3,232,027 A * | 2/1966 | Lorenz .................. B01D 53/14 95/163 |
| 3,237,847 A | 3/1966 | Wilson |
| 3,254,473 A | 6/1966 | Fryar et al. |
| 3,255,573 A | 6/1966 | Cox, Jr. et al. |
| 3,288,448 A | 11/1966 | Patterson et al. |
| 3,321,890 A | 5/1967 | Barnhart |
| 3,347,019 A | 10/1967 | Barnhart |
| 3,360,127 A | 12/1967 | Wood, Jr. |
| 3,396,512 A | 8/1968 | McMinn et al. |
| 3,398,723 A | 8/1968 | Smalling |
| 3,407,052 A | 10/1968 | Huntress et al. |
| 3,528,758 A | 9/1970 | Perkins |
| 3,540,821 A | 11/1970 | Siegmund |
| 3,541,763 A | 11/1970 | Heath et al. |
| 3,589,984 A | 6/1971 | Reid |
| 3,616,598 A | 11/1971 | Floral, Jr. |
| 3,648,434 A | 3/1972 | Gravis, III et al. |
| 3,659,401 A | 5/1972 | Giammarco |
| 3,662,017 A * | 5/1972 | Woerner .................. C07C 7/11 585/800 |
| 3,672,127 A | 6/1972 | Mayse et al. |
| 3,736,725 A | 6/1973 | Alleman et al. |
| 3,817,687 A | 6/1974 | Cavallero et al. |
| 3,829,521 A | 8/1974 | Green |
| 3,855,337 A | 12/1974 | Foral, Jr. et al. |
| 3,872,682 A | 3/1975 | Shook |
| 3,949,749 A | 4/1976 | Stewart |
| 3,989,487 A | 11/1976 | Peterson |
| 4,009,985 A | 3/1977 | Hirt |
| 4,010,009 A | 3/1977 | Moyer |
| 4,010,065 A | 3/1977 | Alleman |
| 4,058,147 A | 11/1977 | Stary et al. |
| 4,098,303 A | 7/1978 | Gammell |
| 4,108,618 A | 8/1978 | Schneider |
| 4,118,170 A | 10/1978 | Hirt |
| 4,134,271 A | 1/1979 | Datia |
| 4,162,145 A | 7/1979 | Alleman |
| 4,198,214 A | 4/1980 | Heath et al. |
| 4,270,938 A | 6/1981 | Schmidt et al. |
| 4,286,929 A | 9/1981 | Heath et al. |
| 4,305,895 A | 12/1981 | Heath et al. |
| 4,322,265 A | 3/1982 | Wood |
| 4,332,643 A | 6/1982 | Reid |
| 4,342,572 A | 8/1982 | Heath |
| 4,362,462 A | 12/1982 | Blotenberg |
| 4,369,049 A | 1/1983 | Heath |
| 4,396,371 A | 8/1983 | Lorenz et al. |
| 4,402,652 A | 9/1983 | Gerlach et al. |
| 4,421,062 A | 12/1983 | Padilla, Sr. |
| 4,431,433 A | 2/1984 | Gerlach et al. |
| 4,435,196 A | 3/1984 | Pielkenrood |
| 4,459,098 A | 7/1984 | Turek et al. |
| 4,462,813 A | 7/1984 | May et al. |
| 4,474,549 A | 10/1984 | Capone |
| 4,474,550 A | 10/1984 | Heath et al. |
| 4,493,770 A | 1/1985 | Moilliet |
| 4,501,253 A | 2/1985 | Gerstmann et al. |
| 4,505,333 A | 3/1985 | Ricks |
| 4,511,374 A | 4/1985 | Heath |
| 4,539,023 A | 9/1985 | Boley |
| 4,568,268 A | 2/1986 | Gerlach et al. |
| 4,579,565 A | 4/1986 | Heath |
| 4,583,998 A | 4/1986 | Reid et al. |
| 4,588,372 A | 5/1986 | Torborg |
| 4,588,424 A | 5/1986 | Heath et al. |
| 4,597,733 A | 7/1986 | Dean et al. |
| 4,615,673 A | 10/1986 | Heath et al. |
| 4,617,030 A | 10/1986 | Heath |
| 4,659,344 A | 4/1987 | Gerlach et al. |
| 4,674,446 A | 6/1987 | Padilla, Sr. |
| 4,676,806 A | 6/1987 | Dean et al. |
| 4,689,053 A | 8/1987 | Heath |
| 4,701,188 A | 10/1987 | Mims |
| 4,715,808 A | 12/1987 | Heath et al. |
| 4,737,168 A | 4/1988 | Heath |
| 4,778,443 A | 10/1988 | Sands et al. |
| 4,780,115 A | 10/1988 | Ranke |
| 4,824,447 A | 4/1989 | Goldsberry |
| 4,830,580 A | 5/1989 | Hata et al. |
| 4,919,777 A | 4/1990 | Bull |
| 4,948,393 A | 8/1990 | Hodson et al. |
| 4,949,544 A | 8/1990 | Hines |
| 4,978,291 A | 12/1990 | Nakai |
| 4,983,364 A | 1/1991 | Buck et al. |
| 5,080,802 A | 1/1992 | Cairo, Jr. et al. |
| 5,084,074 A | 1/1992 | Beer et al. |
| 5,129,925 A | 7/1992 | Marsala et al. |
| 5,130,078 A | 7/1992 | Dillman |
| 5,132,011 A | 7/1992 | Ferris |
| 5,163,981 A | 11/1992 | Choi |
| 5,167,675 A | 12/1992 | Rhodes |
| 5,191,990 A | 3/1993 | Fritts |
| 5,195,587 A | 3/1993 | Webb |
| 5,209,762 A | 5/1993 | Lowell |
| 5,249,739 A | 10/1993 | Bartels et al. |
| 5,269,886 A | 12/1993 | Brigham |
| 5,346,537 A | 9/1994 | Lowell |
| 5,377,723 A | 1/1995 | Hilliard |
| 5,419,299 A | 5/1995 | Fukasawa et al. |
| 5,453,114 A | 9/1995 | Ebeling |
| 5,476,126 A | 12/1995 | Hilliard et al. |
| 5,490,873 A | 2/1996 | Behrens et al. |
| 5,501,253 A | 3/1996 | Weiss |
| 5,513,680 A | 5/1996 | Hilliard et al. |
| 5,536,303 A | 7/1996 | Ebeling |
| 5,571,310 A | 11/1996 | Nanaji |
| 5,579,740 A | 12/1996 | Cotton et al. |
| 5,664,144 A | 9/1997 | Yanai et al. |
| 5,665,144 A | 9/1997 | Hill et al. |
| 5,678,411 A | 10/1997 | Matsumura et al. |
| 5,755,854 A | 5/1998 | Nanaji |
| 5,766,313 A | 6/1998 | Heath |
| 5,826,433 A | 10/1998 | Dube |
| 5,857,616 A | 1/1999 | Karnoff et al. |
| 5,878,725 A | 3/1999 | Osterbrink |
| 5,882,486 A | 3/1999 | Moore |
| 5,885,060 A | 3/1999 | Cunkelman et al. |
| 5,988,232 A | 11/1999 | Koch et al. |
| 6,004,380 A | 12/1999 | Landreau et al. |
| 6,010,674 A | 1/2000 | Miles et al. |
| 6,023,003 A | 2/2000 | Dunning et al. |
| 6,027,311 A | 2/2000 | Hill et al. |
| 6,095,793 A | 8/2000 | Greeb |
| 6,142,191 A | 11/2000 | Sutton et al. |
| 6,183,540 B1 | 2/2001 | Thonsgaard |
| 6,193,500 B1 | 2/2001 | Bradt et al. |
| 6,223,789 B1 | 5/2001 | Koch |
| 6,224,369 B1 | 5/2001 | Moneyhun |
| 6,238,461 B1 | 5/2001 | Heath |
| 6,251,166 B1 | 6/2001 | Anderson |
| 6,273,937 B1 | 8/2001 | Schucker |
| 6,299,671 B1 | 10/2001 | Christensen |
| 6,314,981 B1 | 11/2001 | Mayzou et al. |
| 6,332,408 B2 | 12/2001 | Howlett |
| 6,363,744 B2 | 4/2002 | Finn et al. |
| 6,364,933 B1 | 4/2002 | Heath |
| 6,425,942 B1 | 7/2002 | Forster |
| 6,461,413 B1 | 10/2002 | Landreau et al. |
| 6,478,576 B1 | 11/2002 | Bradt et al. |
| 6,499,476 B1 | 12/2002 | Reddy |
| 6,532,999 B2 | 3/2003 | Pope et al. |
| 6,533,574 B1 | 3/2003 | Pechoux |
| 6,537,349 B2 | 3/2003 | Choi et al. |
| 6,537,458 B1 | 3/2003 | Polderman |
| 6,551,379 B2 | 4/2003 | Heath |
| 6,604,558 B2 | 8/2003 | Sauer |
| 6,616,731 B1 | 9/2003 | Hillstrom |
| 6,719,824 B1 | 4/2004 | Bowser |

(56) References Cited

U.S. PATENT DOCUMENTS

| | | |
|---|---|---|
| 6,745,576 B1 | 6/2004 | Granger |
| 6,931,919 B2 | 8/2005 | Weldon |
| 6,984,257 B2 | 1/2006 | Heath et al. |
| 7,005,057 B1 | 2/2006 | Kalnes |
| 7,025,084 B2 | 4/2006 | Perry et al. |
| 7,131,265 B2 | 11/2006 | Lechner |
| RE39,944 E | 12/2007 | Heath |
| 7,350,581 B2 | 4/2008 | Wynn |
| 7,481,237 B2 | 1/2009 | Jones et al. |
| 7,497,180 B2 | 3/2009 | Karlsson et al. |
| 7,531,030 B2 | 5/2009 | Heath et al. |
| 7,575,672 B1 | 8/2009 | Gilmore |
| 7,905,722 B1 | 3/2011 | Heath et al. |
| 8,529,215 B2 | 9/2013 | Heath et al. |
| 2001/0008073 A1 | 7/2001 | Finn et al. |
| 2002/0073843 A1 | 6/2002 | Heath |
| 2002/0081213 A1 | 6/2002 | Takahashi et al. |
| 2002/0178918 A1 | 12/2002 | Lecomte et al. |
| 2002/0185006 A1 | 12/2002 | Lecomte et al. |
| 2003/0005823 A1 | 1/2003 | Le Blanc et al. |
| 2003/0167690 A1 | 9/2003 | Edlund et al. |
| 2004/0031389 A1 | 2/2004 | Heath et al. |
| 2004/0186630 A1 | 9/2004 | Shier et al. |
| 2004/0211192 A1 | 10/2004 | Lechner |
| 2005/0115248 A1 | 6/2005 | Koehler et al. |
| 2005/0266362 A1 | 12/2005 | Stone et al. |
| 2006/0144080 A1 | 7/2006 | Heath et al. |
| 2006/0156744 A1 | 7/2006 | Cusiter et al. |
| 2006/0156758 A1 | 7/2006 | An et al. |
| 2006/0218900 A1 | 10/2006 | Lechner |
| 2006/0254777 A1 | 11/2006 | Wynn |
| 2006/0260468 A1 | 11/2006 | Amin |
| 2007/0051114 A1 | 3/2007 | Mahlanen |
| 2007/0084341 A1 | 4/2007 | Heath et al. |
| 2007/0151292 A1 | 7/2007 | Heath et al. |
| 2007/0175226 A1 | 8/2007 | Karlsson et al. |
| 2007/0186770 A1 | 8/2007 | Heath et al. |
| 2007/0199696 A1 | 8/2007 | Walford |
| 2008/0008602 A1 | 1/2008 | Pozivil et al. |
| 2008/0120993 A1 | 5/2008 | An et al. |
| 2009/0133578 A1 | 5/2009 | Bras et al. |
| 2009/0223246 A1 | 9/2009 | Heath et al. |
| 2010/0040989 A1 | 2/2010 | Heath et al. |
| 2012/0079851 A1 | 4/2012 | Heath et al. |
| 2012/0261092 A1 | 10/2012 | Heath et al. |
| 2013/0319844 A1 | 12/2013 | Heath et al. |

FOREIGN PATENT DOCUMENTS

| | | |
|---|---|---|
| CA | 2281610 | 9/1998 |
| CA | 2426071 | 10/2003 |
| CA | 2224389 | 2/2008 |
| CA | 2311440 | 6/2011 |
| CA | 2563747 | 5/2013 |
| FR | 2542039 | 9/1984 |
| GB | 370591 | 4/1932 |
| GB | 573819 | 12/1945 |
| JP | 58185990 A | 10/1983 |
| RU | 2159913 | 11/2000 |
| SU | 1021809 | 6/1983 |
| SU | 1801092 | 3/1993 |
| WO | 2005/068847 | 7/2005 |
| WO | 2010/080040 | 7/2010 |
| WO | 2013/170190 | 11/2013 |

OTHER PUBLICATIONS

Archer, "TEG Regenerator Vapor Recovery in Amoco's Northwestern Business Unit", Amoco Northwestern Business Unit, Aug. 1992.

Reid, "Coldfinger an Exhauster for Removing Trace Quantities of Water from Glycol Solutions Used for Gas Dehydration", Ball-Reid Engineers, Inc., Oklahoma City, Oklahoma, 1975, 592-602.

* cited by examiner

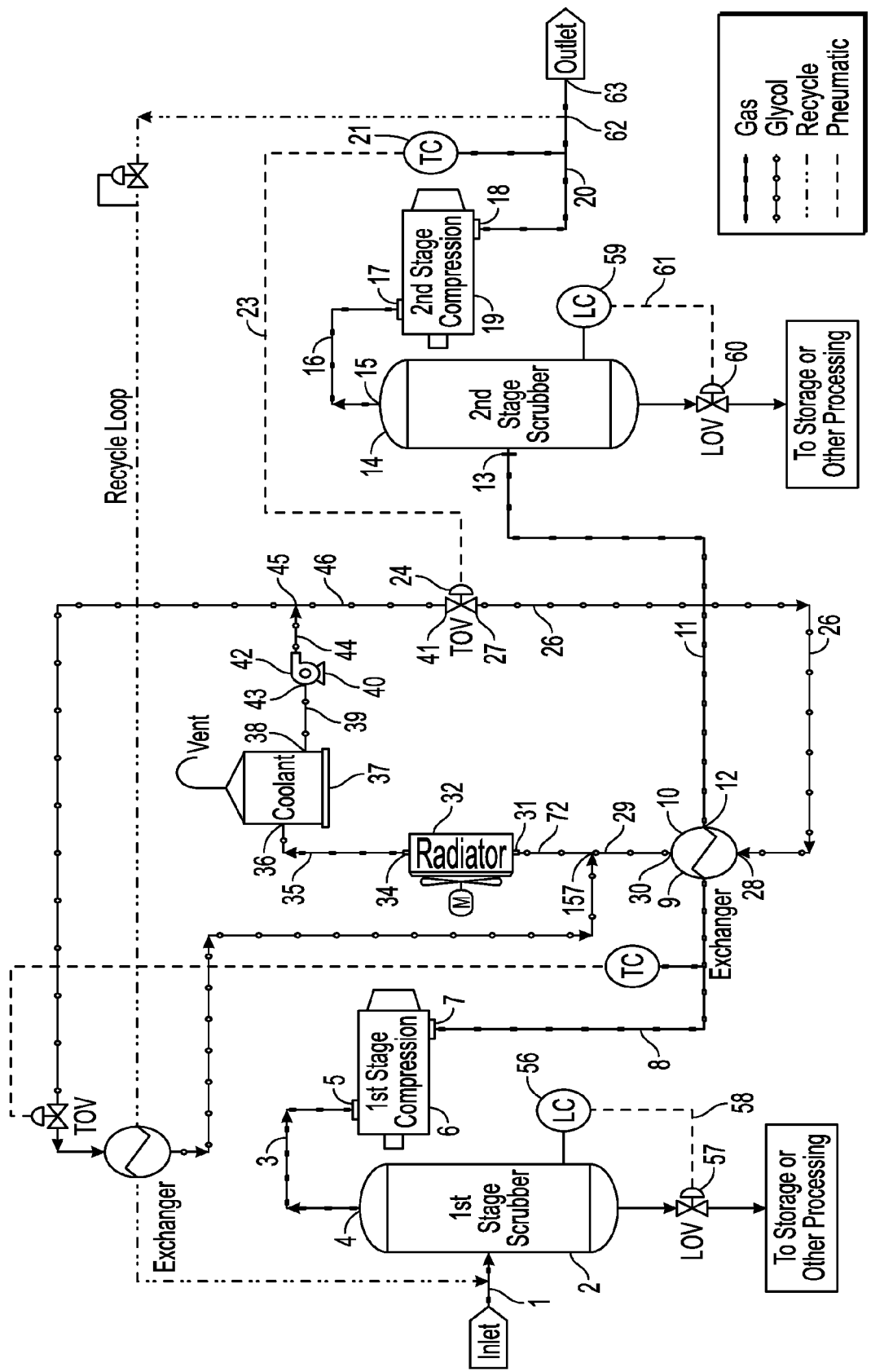

COMPRESSOR INTER-STAGE TEMPERATURE CONTROL

CROSS-REFERENCE TO RELATED APPLICATIONS

This application claims priority to and the benefit of the filing of U.S. Provisional Patent Application Ser. No. 61/798,380, entitled "Compressor Inter-Stage Temperature Control", filed on Mar. 15, 2013, and the specification thereof is incorporated herein by reference.

BACKGROUND OF THE INVENTION

1. Field of the Invention (Technical Field)

Embodiments of the present invention relate to a method, system, and apparatus for controlling the gas temperature of the gas flowing between compression stages so that the temperature of the gas always remains above the dew-point and hydrate temperature of the gas. A further embodiment of the present invention provides a method for controlling inner stage compression temperatures that can be part of a new compressor assembly or retrofitted to compressors already installed and operating.

2. Description of Related Art

To collect gases that are commonly vented by process equipment used at natural gas locations, including but not limited to well sites and processing plants, a flash gas compressor is commonly used. The flash gas compressors operate at pounds of suction pressure (usually 25 to 100 pounds per square inch gauge ("psig") and discharge pressures generally above 100 and less than 1500 psig). The compressors generally have from one to four compression stages and the gas entering and leaving the inner compression stages is cooled by flowing through a radiator utilizing air, driven by a fan, as the heat sink.

During cool weather, the air circulating through the gas cooler radiator can cool the gas to a temperature below the hydrocarbon dew-point of the gas as well as cooling the gas to a temperature that causes gas hydrates to form.

Cooling the gas below its dew-point results in hydrocarbon liquids forming in the gas stream. The hydrocarbon liquids are separated from the gas by scrubbers installed between the compression stages. The hydrocarbon liquids that condense and are separated by the scrubbers are commonly called "recycle loops". Depending upon the British Thermal Units of heat ("BTU") of the gas, how low the ambient temperature is, and how high the inner stage compression pressures are, the recycle loops, when dumped back to the storage tank, can create a volume of hydrocarbon vapors that will overload the vapor recovery system or require installation of a pressurized storage tank or flaring.

Cooling the gas below the hydrate formation temperature causes ice crystals to form in the radiator, potentially blocking the flow of gas. There is thus a present need for a method, system, and apparatus which can consistently cool the gas between multiple stages of compression so that the gas temperature remains above the dew-point of the gases and below a temperature which would cause thermal damage to the compressor when the vapors are compressed in a subsequent stage of compression.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF SUMMARY OF EMBODIMENTS OF THE PRESENT INVENTION

An embodiment of the present invention relates to a system for maintaining temperature of a gas between stages of compression including introducing the gas into a first stage of compression; directing the gas from the first stage of compression to a heat exchanger; directing the gas from the heat exchanger to an interstage scrubber; directing the gas from the interstage scrubber to a second stage of compression; and controlling a volume of coolant traveling through the heat exchanger by sensing a temperature of the gases that have exited a second stage of compression.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWING

The accompanying drawing, which is incorporated into and forms a part of the specification, illustrates one or more embodiments of the present invention and, together with the description, serves to explain the principles of the invention. The drawing is only for the purpose of illustrating one or more preferred embodiments of the invention and is not to be construed as limiting the invention.

FIG. 1 is a flow diagram illustrating an embodiment of the present invention.

DETAILED DESCRIPTION OF THE INVENTION

Referring now to FIG. 1, a flow diagram is illustrated wherein a two stage compressor is equipped with a liquid cooling section to control the temperature of compression. FIG. 1 also illustrates an optional gas recycle loop that includes a liquid cooling section to cool the recycle gas going to the inlet scrubber. Embodiments of the present invention can provide desirable results without this optional gas recycle loop.

Referring to FIG. 1, system 100 preferably includes gas inlet line 1, which leads to compressor inlet scrubber 2. Liquid level controller 56 preferably controls the liquid level in inlet scrubber 2. A supply gas source (not shown) is preferably connected to liquid level controller 56. Tubing line 58 preferably carries a pneumatic signal from liquid level controller 56 to motor valve 57. Gas line 3 can connect outlet 4 of inlet scrubber 2 to suction port 5 of first stage 6 of a compressor. Gas flow line 8 can connect discharge 7 of first stage of compression 6 to inlet 9 of a tube section of heat exchanger 10. Gas line 11 preferably connects outlet 12 of the tube section of heat exchanger 10 to inlet 13 of first stage inter stage scrubber 14. Liquid level controller 59 preferably has a supply gas source (not shown). Motor valve 60 can be powered by a pneumatic signal traveling through line 61 from liquid level controller 59. Gas line 16 preferably connects outlet 15 of inter stage scrubber 14 to suction port 17 of second stage of compression 19. Gas line 20 preferably carries the compressed gas from discharge port 18 of second stage of compression 19 to point 62. Line 63 preferably sends the gas from point 62 to be further processed or to sales. Thermostat 21 has a supply gas source (not shown). Tubing line 23 can carry the output signal from thermostat 21 to motor valve 24. Motor valve 24 can be a throttling type motor valve. Motor valve 24 can be installed on either the inlet or outlet of heat exchanger 10. As illustrated, line 26 preferably connects outlet 27 of motor valve 24 to inlet 28 of a shell section of heat exchanger 10. Line 29 can connect outlet 30 of the shell section of heat exchanger 10 to point 157. Line 72 preferably connects from point 157 to inlet 31 of air cooled radiator 32. Line 35 connects outlet 34 of air cooled radiator 32 to inlet 36 of liquid reservoir 37. Line 39 connects outlet 38 of liquid reservoir 37 to inlet 43 of centrifugal pump 40. Line 44 connects the outlet 42 of centrifugal pump 40 to point 45. Line 46 connects from point 45 to inlet 41 of throttling motor valve 24.

Referring again to FIG. 1 which illustrates an embodiment of the invention, in one embodiment the unit can operate as follows: gas to be compressed enters the compressor system through line 1 into inlet scrubber 2. From inlet scrubber 2 the gas flows through line 3 into first stage of compression 6. The hot compressed gas from first stage of compression 6 flows through line 8 and enters, at inlet 9, the tube section of heat exchanger 10. While flowing through the tube section of heat exchanger 10 the hot compressed gas is cooled by the liquid contained in the shell section of heat exchanger 10. In one embodiment, the cooled gas exits heat exchanger 10 at the outlet 12 and flows through line 11 to enter at the inlet 13 first inter stage scrubber 14. While flowing through first inter stage scrubber 14, any liquids that have been condensed by cooling of the gas in heat exchanger 10 are thus preferably separated. The separated liquids can be dumped by liquid level control 59 and motor valve 60 to a storage tank or other vessels (not shown). The cooled gases exit first inter stage scrubber 14 at outlet 15 and flow through line 16 to enter the second stage of compression 19 at suction port 17. While flowing through the second stage of compression 19 the pressure and temperature of the gas is preferably increased. The gas exits second stage of compression 19 through discharge port 18 and flows through lines 20 and 63 to repeat the cooling process previously described for second stage 19 before optionally entering a third stage of compression. An additional fourth stage of compression can also optionally be used with the same cooling process as described for the second stage of compression 19. After discharge from the final stage of compression, the compressed gas can be directed to a sales line or other location, such as for further processing.

Referring again to FIG. 1, the operation of an embodiment of the present invention is described. An embodiment of system 100 operates by utilizing an antifreeze water solution, which can be the same as the antifreeze water solution used in car radiators. The main components of the liquid cooling process is heat exchanger 10, air cooled radiator 32, centrifugal pump 40, throttling motor valve 24, coolant reservoir 37, and thermostat 21. The antifreeze solution is preferably stored in reservoir 37. From outlet 38, the antifreeze solution preferably flows line through 39 to the inlet 43 of centrifugal pump 40. From the outlet 42 the pressurized antifreeze solution flows through lines 44 and 46 to the inlet of throttling motor valve 24. The amount of the opening of throttling motor valve 24 can optionally be controlled by thermostat 21. Thermostat 21 preferably senses the temperature of the gas exiting second stage of compression 19. Thermostat 21 is preferably set to accomplish two things. First, thermostat 21 preferably maintains a temperature in inter stage scrubber 14 that is above the hydrocarbon dew point of the compressed gases flowing through inter stage scrubber 14. The second is to maintain the temperature of the gases exiting the second stage of compression 19 to be below the maximum temperature rating of the compressor. Usually, the maximum rated temperature of a compressor will be in a range of about 300 degrees F. From outlet 27 of throttling control valve 24, a controlled volume of the antifreeze solution flows through line 26 to the inlet 28 of the shell section of heat exchanger 10. While flowing through the shell section of heat exchanger 10 the antifreeze solution acts as a heat sink to cool the hot compressed gas flowing through the tube section of heat exchanger 10. By controlling, with thermostat 21 and throttling motor valve 24, the volume of cool liquid entering the shell section of heat exchanger 10, the temperature of the liquid in the shell section can be maintained at the temperature required to only cool the hot gases flowing through the tube section of heat exchanger 10 enough to keep the temperature of the gas exiting the second stage of compression within an acceptable temperature operating range and so as to avoid thermal damage to the compressor.

The antifreeze solution preferably exits heat exchanger 10 and flows through lines 29 and 72 to the inlet of air cooled radiator 32. Air cooled radiator 32 can optionally be a radiator similar to a radiator on a car or truck, or, as illustrated, it can be of a design where the radiator and coolant reservoir are separate units. While flowing through radiator 32, the antifreeze solution is preferably cooled by air which is driven by a fan. The cooled antifreeze solution exits radiator 32 and flows through line 35 to inlet 36 of coolant reservoir 37. The antifreeze solution exits coolant reservoir 37 and flows through line 39 to the inlet 43 of coolant pump 40. Coolant pump 40 can be a centrifugal pump. When throttling motor valve 24 begins closing, the discharge pressure of centrifugal pump 40 preferably increases slightly but the pump continues running normally.

Although embodiments of the present invention most preferably operate via pneumatic control using pneumatically-operated components, other types of control and sources for power of operation can optionally be used in place of or in conjunction with one or more of the pneumatic controls and pneumatically-powered components. Accordingly, in one embodiment one or more electrically-operated components can be provided. Optionally, one or more manually-powered controls can be provided and an operator can operate them.

In one embodiment, the present invention is disposed at a well site and not at another location. In one embodiment, the present invention is skid-mounted.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A system for maintaining temperature of a gas between stages of compression comprising:
   introducing the gas into a first stage of compression;
   directing the gas from the first stage of compression to a first heat exchanger;
   directing the gas from the first heat exchanger to an interstage scrubber;
   directing the gas from the interstage scrubber to a second stage of compression; and controlling a volume of liquid coolant traveling through the first heat exchanger by sensing a temperature of the gas that has exited a second stage of compression.

2. The system of claim 1 wherein the liquid coolant comprises antifreeze.

3. The system of claim 1 wherein the liquid coolant is cooled via an air-cooled heat exchanger.

4. The system of claim 1 wherein condensed liquids are removed from the interstage scrubber.

5. The system of claim 1 further comprising directing gas from the second stage of compression to a second heat exchanger.

6. The system of claim 5 wherein second heat exchanger cools the compressed gas by transferring energy to a liquid coolant.

7. The system of claim 1 further comprising a first motor valve which is positioned to adjust the flow of the liquid coolant to the first heat exchanger.

8. The system of claim 7 wherein the first motor valve comprises a throttling motor valve.

9. The system of claim 8 wherein the flow of liquid coolant to the first heat exchanger is adjusted to control temperature of the gas passing through the first heat exchanger.

10. The system of claim 9 wherein the first motor valve is adjusted in response to the sensed temperature of the gas that has exited a second stage of compression.

11. The system of claim 7 further comprising a second motor valve.

12. The system of claim 11 wherein the second motor valve adjusts the flow of liquid passing through a second heat exchanger.

13. The system of claim 12 wherein the second heat exchanger is communicably coupled to an outlet of a second stage of compression.

14. A system for maintaining temperature of a gas between stages of compression comprising:
   introducing the gas into a first stage of compression;
   directing the gas from the first stage of compression to a first heat exchanger;
   controlling a volume of liquid coolant traveling through the first heat exchanger by sensing a temperature of the gas that has exited a second stage of compression and adjusting a motor valve that is communicably coupled to the first heat exchanger; and
   cooling the liquid coolant via a first air-cooled heat exchanger.

15. The system of claim 14 further comprising directing the gas from the first heat exchanger to a second stage of compression.

16. The system of claim 15 further comprising directing the gas from the second stage of compression to a second heat exchanger.

17. The system of claim 16 further comprising controlling a volume of liquid coolant traveling through the second heat exchanger by sensing a temperature of the gas that has existed a third stage of compression.

18. The system of claim 17 wherein the liquid coolant traveling through the second heat exchanger is cooled via a second air-cooled heat exchanger.

* * * * *